US006397297B1

(12) United States Patent
Sperber et al.

(10) Patent No.: US 6,397,297 B1
(45) Date of Patent: May 28, 2002

(54) DUAL CACHE WITH MULTIPLE INTERCONNECTION OPERATION MODES

(75) Inventors: Zeev Sperber, Zichron Yakov; Jack Doweck; Nicolas Kacevas, both of Haifa; Roy Nesher, Hadera, all of (IL)

(73) Assignee: Intel Corp., Santa Clara, CA (US)

( * ) Notice: Subject to any disclaimer, the term of this patent is extended or adjusted under 35 U.S.C. 154(b) by 0 days.

(21) Appl. No.: 09/474,782

(22) Filed: Dec. 30, 1999

(51) Int. Cl.$^7$ ............................................... G06F 12/00
(52) U.S. Cl. ........................ 711/122; 711/118; 711/122
(58) Field of Search .................................. 711/122, 128, 711/140, 141, 146, 170, 207, 120, 118, 145; 710/54; 709/233

(56) References Cited

U.S. PATENT DOCUMENTS

| | | | | |
|---|---|---|---|---|
| 4,395,754 A | * | 7/1983 | Feissel ........................ 711/207 |
| 4,707,784 A | * | 11/1987 | Ryan et al. ................. 711/140 |
| 5,210,845 A | * | 5/1993 | Crawford et al. ........... 711/128 |
| 5,237,673 A | * | 8/1993 | Orbits et al. ................ 711/170 |
| 5,537,575 A | * | 7/1996 | Foley et al. ................. 711/141 |
| 5,699,552 A | * | 12/1997 | Whittaker .................... 711/146 |
| 5,787,471 A | | 7/1998 | Inoue et al. ................. 711/133 |
| 6,012,108 A | * | 1/2000 | Kang ........................... 710/54 |
| 6,081,844 A | * | 6/2000 | Nowatzyk et al. .......... 709/233 |
| 6,085,288 A | * | 7/2000 | Arimilli et al. ............. 711/118 |
| 6,167,489 A | * | 12/2000 | Bauman et al. ............. 711/145 |

OTHER PUBLICATIONS

J.G. Brenza: Second Level Cache Fast Access, IBM Technical Disclosure Bulletin, Mar. 1, 1984, pp. 5488–5490.

* cited by examiner

Primary Examiner—David Hudspeth
Assistant Examiner—Fred F. Tzeng
(74) Attorney, Agent, or Firm—Kenyon & Kenyon

(57) ABSTRACT

A computer system having cache modules interconnected in series includes a first and a second cache module directly coupled to an address generating line for parallel lookup of data and data conversion logic coupled between the first cache module and said second cache module.

18 Claims, 8 Drawing Sheets

DUAL CACHE WITH MULTIPLE INTERCONNECTION OPERATION MODES

FIELD OF THE INVENTION

The present invention generally relates to computer systems. More particularly, the present invention relates to a method and apparatus of improving performance in computer systems by arranging cache modules in several interconnected operational modes.

BACKGROUND OF THE INVENTION

A cache or cache module as used interchangeably throughout this specification, is intended to enhance the speed at which information and data are retrieved. A main memory typically stores a large amount of data which is time consuming to retrieve. The cache module contains a copy of portions of the main memory. When a processor attempts to read a word of memory, a check is made to determine if the word is in the cache module. If so, the word is delivered to the processor. If not, a block of main memory, consisting of some fixed number of words, is read into the cache module and then the word is delivered to the processor.

The main memory consists of up to $2^n$ addressable words, with each word having a unique n-bit address. For mapping purposes, this memory is considered to consist of a number of fixed-length blocks of K words each. That is, there are $M=2^n/K$ blocks. The cache module consists of C lines of K words each, and the number of lines is considerably less than the number of main memory blocks.

FIG. 1 is a block diagram illustrating a simplified picture of a network involving a processor 12 with cache module 40 connected via address, control and data lines 43, 44, and 45, respectively. Address and data lines 43 and 45 also attached to address and data buffers 41 and 42, respectively which attached to system bus 20 from which main memory (not shown) is reached.

Typically, processor 12 generates an address of a word to be read. If a "hit" occurs, (the word is contained in cache module 40), the word is delivered to processor 12. When this cache hit occurs, the data and address buffers 42 and 41, respectively, are disabled and communication is only between the processor 12 and the cache module 40, with no system bus traffic. When a cache "miss" occurs, (the word is not contained in cache module 40), the desired address is loaded from main memory (not shown) onto system bus 20 and the data is returned through data buffer 42 to both the cache module 40 and the main memory. With a cache miss, a line in the cache may be overwritten or copied out of cache module 40 when new data is stored in the cache module. This overwritten line is referred to as a "victim block" or a "victim line."

The basic structure of a conventional multi-processor computer system 10 employing several cache modules is shown in FIG. 2. Computer system 10 includes processors 12, 120 and 220 as shown which are connected to various peripheral devices including input/output (I/O) devices 14 (such as a display monitor, keyboard, graphical pointer (mouse) and a permanent storage device (hard disk)), memory 16 (such as random access memory or RAM) that is used by processors 12, 120 and 220 to carry out program instructions, and firmware 18 whose primary purpose is to seek out and load an operating system from one of the peripherals (usually the permanent memory device) whenever computer system 10 is first turned on. Processors 12, 120 and 220 communicate with the peripheral devices by various means, including a generalized interconnect or system bus 20, or direct-memory-access channels (not shown).

Processor 12, as well as each of the other processors 120 and 220, includes a processor core 22 having a plurality of registers and execution units, which carry out program instructions 13 in order to operate the computer system 10. As shown, processor 12 further includes one or more cache modules, such as an instruction cache 24 and a data cache 26, which are implemented using high-speed memory devices. As described above, cache modules are commonly used to temporarily store values that might be repeatedly accessed by the processor, in order to speed up processing by avoiding the longer step of loading the values from memory 16. These cache modules are referred to as "on-board" when they are integrally packaged with the processor core on a single integrated chip 28. Each cache module is associated with a cache controller (not shown) that manages the transfer of data and instructions between the processor core 22 and the cache.

Processor 12 can include additional cache modules, such as cache module 30, which is referred to as a level 2 (L2) cache since it supports the on-board (level 1) caches 24 and 26. In other words, cache module 30 acts as an intermediary between memory 16 and the on-board caches, and can store a much larger amount of information (instructions and data) than the on-board caches can, but at a longer access penalty. Cache module 30 is connected to system bus 20, and all loading of information from memory 16 into processor core 22 comes through cache module 30.

One drawback to the conventional cache module arrangement as shown is that the cache modules do not benefit from being interconnected. Without the cache modules being interconnected, it is inefficient to retrieve data since each cache must be searched individually if data is not found in the first cache that is searched.

Accordingly, what is needed is an effective and efficient method for directly connecting cache modules for retrieval of information.

SUMMARY OF THE INVENTION

In accordance with an embodiment of the present invention, a computer system having cache modules interconnected in series includes a first and a second cache module directly coupled to an address generating line for parallel lookup of data and data conversion logic coupled between the first cache module and the second cache module.

DETAILED DESCRIPTION

Embodiments of the present invention relate to an apparatus of arranging cache modules in a serial, parallel and serial/parallel interconnection mode. According to an embodiment of the present invention, a computer system having cache modules interconnected in series includes a first and a second cache module directly coupled to an address generating line for parallel lookup of data and data conversion logic coupled between the first cache module and said second cache module.

According to an alternative embodiment of the present invention, a computer system having caches interconnected in parallel includes a first and a second cache module directly coupled to an address generating line for parallel lookup of data and directly connected to a data generating line.

According to another embodiment of the present invention, a computer system having cache modules interconnected in series/parallel includes a first and a second cache module directly coupled to an address generating line for parallel lookup of data and data conversion logic coupled between the first cache module and said second cache module, wherein the first cache module is coupled to a data generating line and the second cache module is coupled to a multiplexer providing converted data from memory and from the first cache module.

The following description is presented to enable one of ordinary skill in the art to make and use the invention. Various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
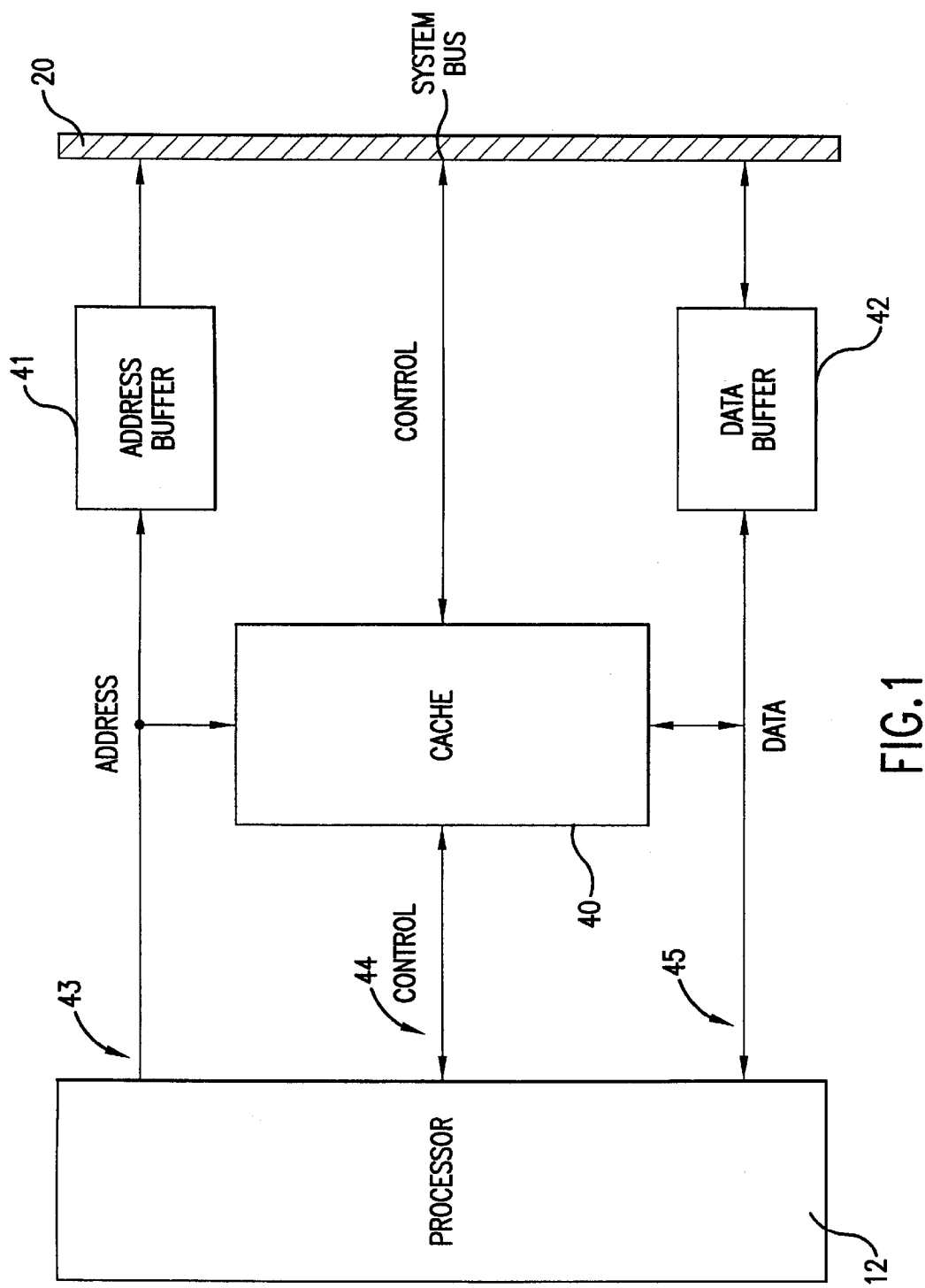
FIG. 1 is a block diagram illustrating a simplified picture of a network involving a processor with a cache module.
Figure 2:
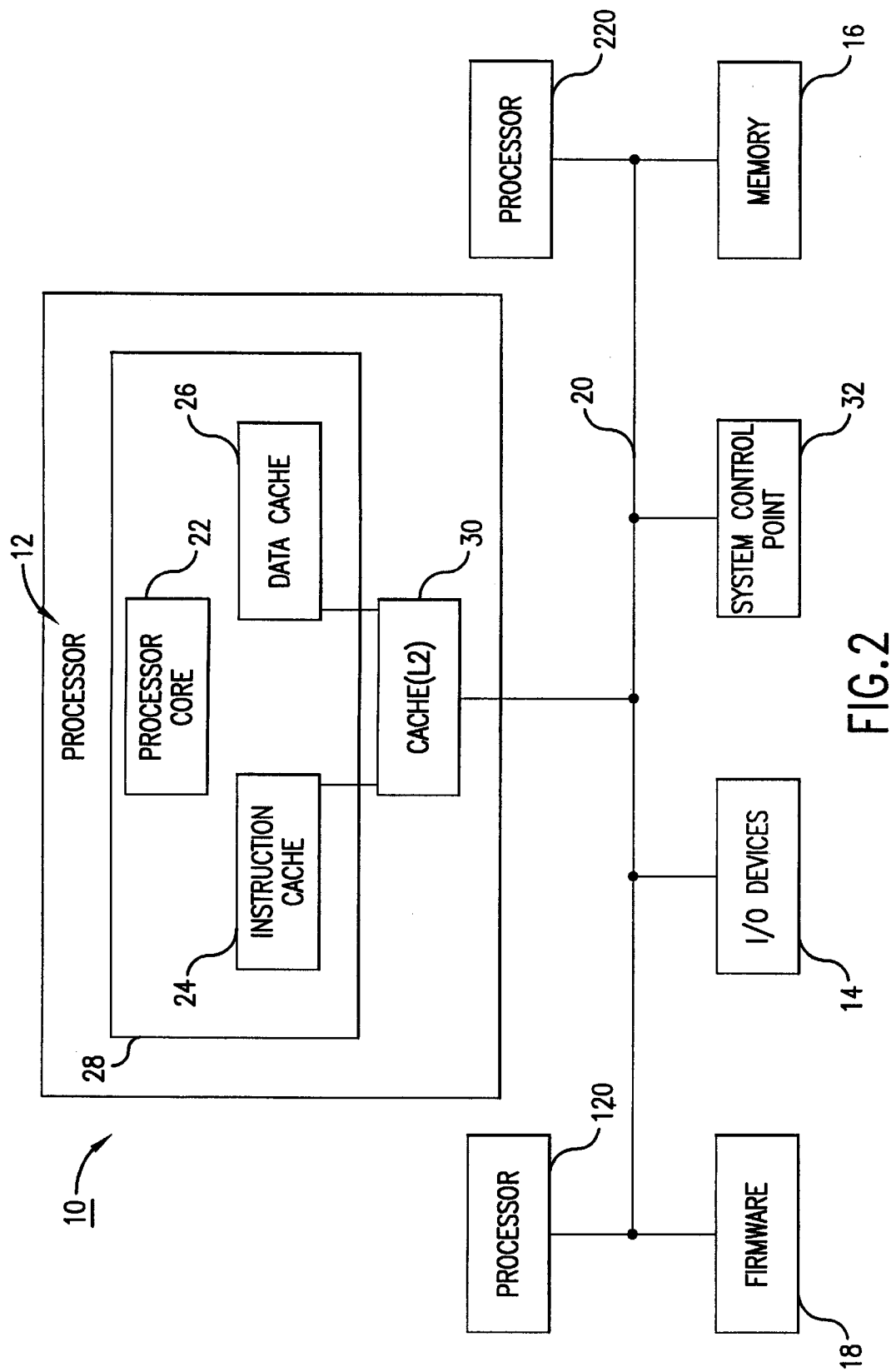
FIG. 2 is a block diagram illustrating a prior art computer system.
Figure 3:
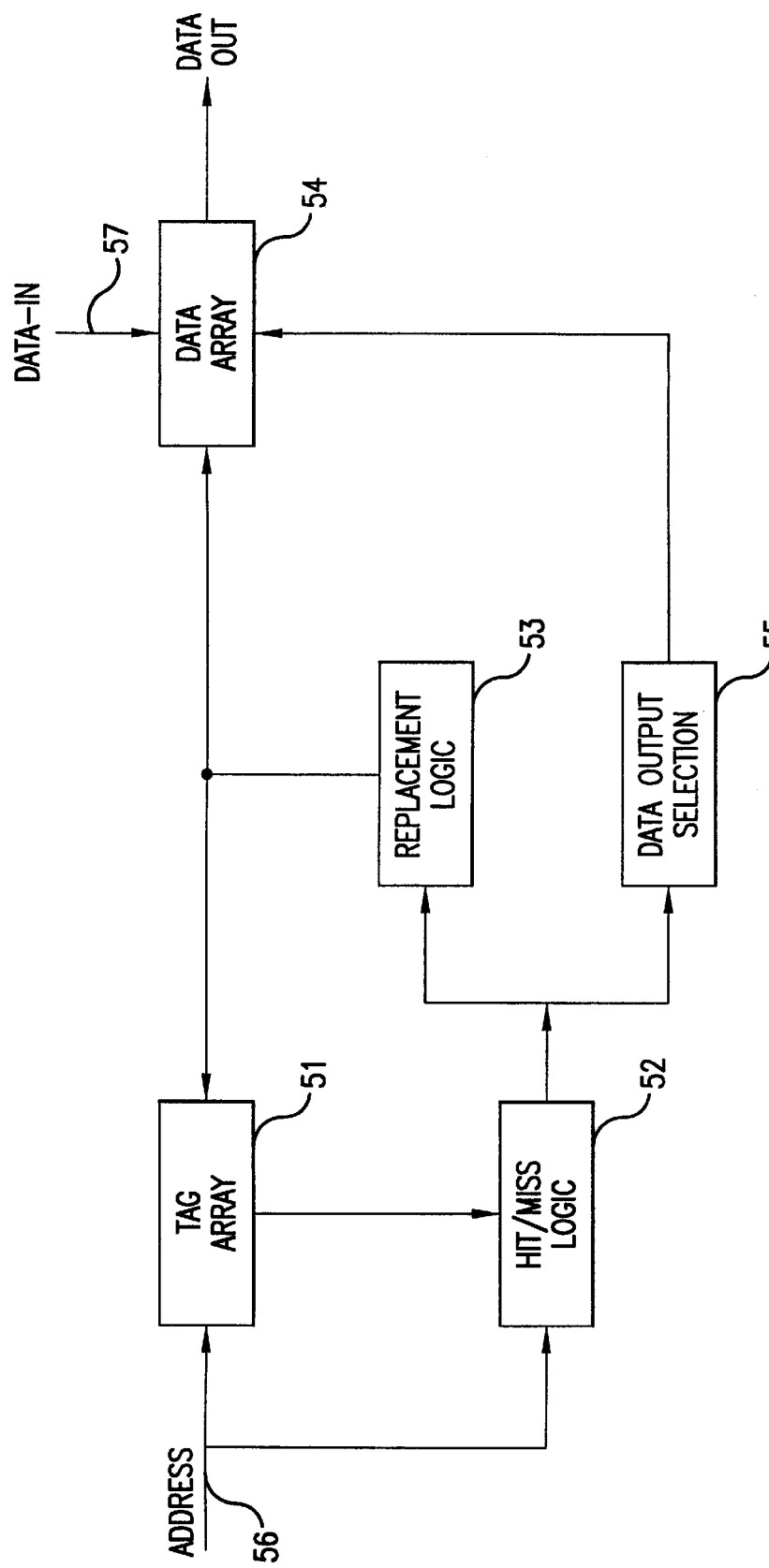
FIG. 3 is a block diagram illustrating the features of a typical cache module.

FIG. 3 is a block diagram illustrating the features of a typical cache module 50. Cache module 50 includes a Tag array 51, Hit/Miss logic 52, Replacement logic 53, Data array 54 and Data output selection 55. Tag array 51 is coupled to Hit/Miss logic 52, Replacement logic 53 and Data array 54. Hit/Miss logic is additionally coupled to Replacement logic 53 and Data output selection 55. Data output selection is further coupled to Data array 54.

Cache module 50 receives an address from processor 12 (not shown) over an address generating line (address) 56. The address is sent to Tag array 51 and Hit/Miss logic 52. Tag array 51 stores tags associated with each cache line of cache 50. Hit/Miss logic 52 compares the address from processor 12 with a corresponding tag array value stored in Tag array 51. Hit/Miss logic 52 also produces a hit/miss indication as to whether the tag array value is located in Tag array 51. If a cache hit occurs, Hit/Miss logic forwards an indication that the tag array value is located in Tag array 51 to Data output selection 55. Data output selection 55 selects data from Data array 54 based on a decision from Hit/Miss logic 52.

Alternatively, if Hit/Miss logic 52 forwards an indication that the tag value is not located in Tag array 51, this indication is sent to Replacement logic 53 which determines a "victim line" when this cache miss occurs. Data is supplied by memory 16 via data generating line (data-in line) 57 to Data array 54 for output.

Figure 4:
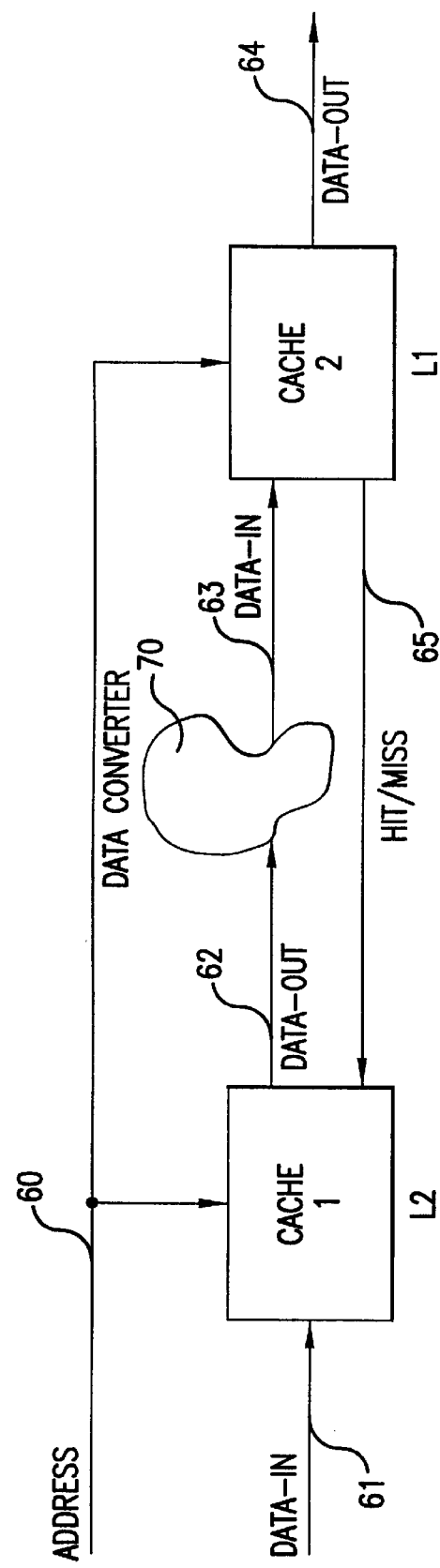
FIG. 4 is a block diagram illustrating a serial interconnection mode of two cache modules according to an embodiment of the present invention.

FIG. 4 illustrates a serial interconnection mode of two cache modules according to an embodiment of the present invention. In the serial interconnection mode, cache module 1 may be a level 2 (L2) cache and cache module 2 may be a level 1 (L1) cache for example. Each cache module includes the same circuitry of cache module 50 as shown in FIG. 3. The serial interconnected mode may be used for data types that are transformed in character between a memory image and a usage with the processor. For example, the L2 cache may cache a memory image, and the L1 cache may contain a cache of processor data. An example of data that could utilize this behavior is single-precision floating point data (in the L2 cache) transformed to 32 bit integer data (in the L1 cache).

In the serial interconnection mode, cache module 1 and cache module 2 are each directly coupled to an address generating line (address line) 60. Address line 60 may also be coupled to processor 12. Cache module 1 is further coupled to a data generating line (Data-In) 61 and a hit/miss generating line (hit/miss) 65. Cache module 1 outputs data on data output line (Data-Out) 62. Data output line 62 is coupled to a data converter 70. Data converter 70 converts the format of data from cache module 1 to a format used by cache module 2. The output of data converter 70 is supplied to cache module 2 via data generating line (Data-In) 63. Cache module 2 outputs data via data output line (Data-Out) 64. Additionally, cache module 2 sends an indication to cache module 1 via hit/miss generating line (hit/miss) 65 whether data was located in cache module 2 or not.

Figure 7:
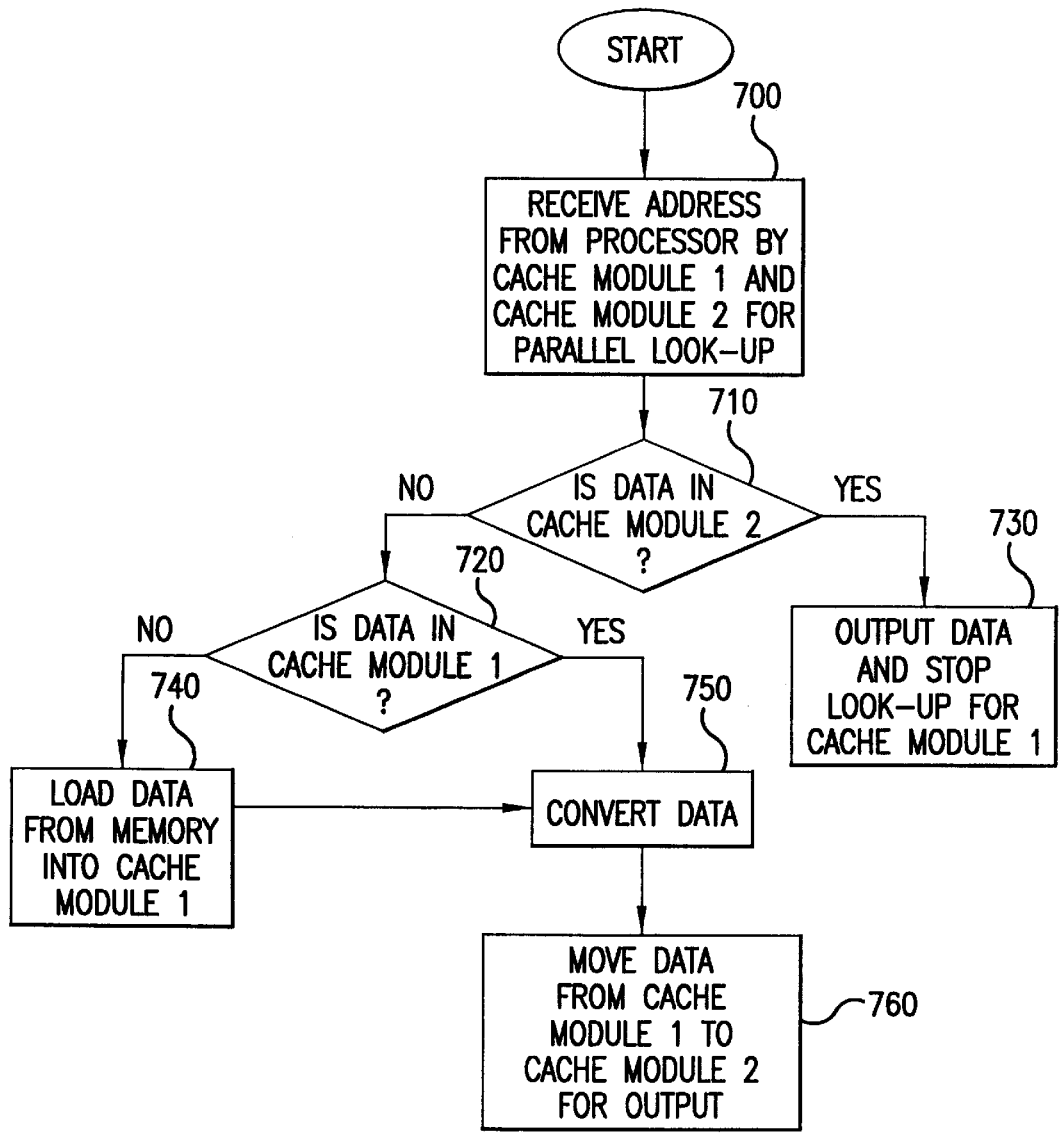
FIG. 7 is a flow diagram illustrating a method for transferring data in a serial interconnection mode of two cache modules according to an embodiment of the present invention.

FIG. 7 illustrates a method for transferring data in the serial interconnection mode of two cache modules according to an embodiment of the present invention. The method begins by receiving an address from processor 12 by cache module 1 and cache module 2 for parallel look up (Step 700). A determination is made as to whether cache module 2 stores the requested data associated with the address from processor 12 (Step 710). If cache module 2 stores that data, the data is output and the look up in cache module 1 stops (Step 730). Alternatively, if cache module 2 does not have the stored data, a determination is made as to whether cache module 1 stores the data (Step 720). If cache module 1 stores the data, the data is first converted from a format used by cache module 1 to a format used by cache module 2 (Step 750) and then the converted data is moved from cache module 1 to cache module 2 for output (Step 760). If, however, the data is not stored in cache module 1, the data is loaded from memory into cache module 1 (Step 740), converted (Step 750) and moved to cache module 2 for output (Step 760).

Figure 5:
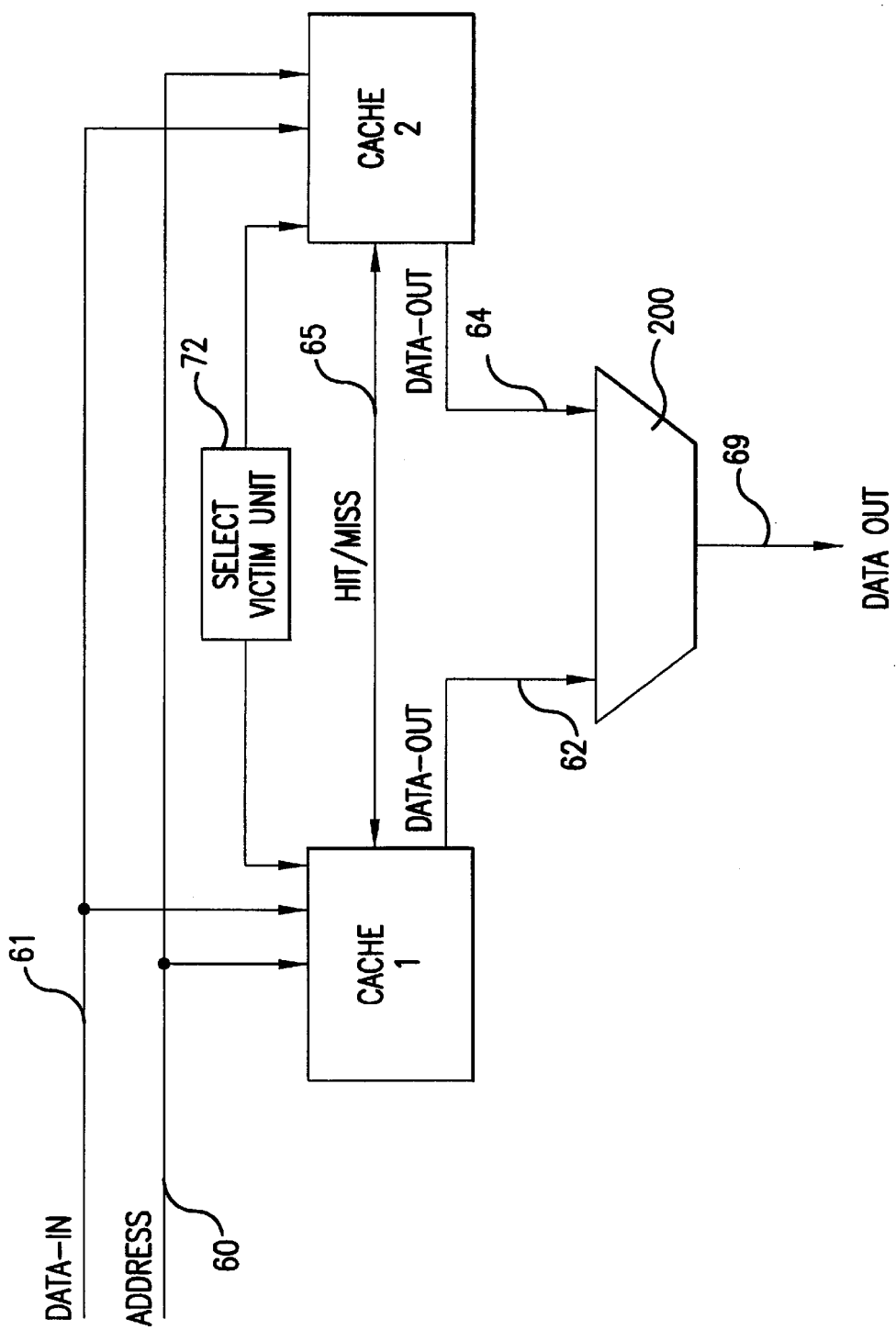
FIG. 5 is a block diagram illustrating a parallel interconnection mode of two cache modules according to an embodiment of the present invention.

FIG. 5 illustrates a parallel interconnection mode of two caches according to an embodiment of the present invention. In the parallel interconnection mode, cache module 1 and cache module 2 may be the same type of cache module (e.g., L1 or L2 caches) and are interconnected in parallel as a single large cache module.

In the parallel interconnection mode, cache module 1 and cache module 2 are each directly coupled to an address generating line (address line) 60. Address line 60 may also be coupled to processor 12. Cache module 1 and cache module 2 are also each directly coupled to a data generating line (Data-In) 61. Data generating line 61 may also be coupled to memory 16. Hit/Miss generating line 65 is coupled between cache module 1 and cache module 2 for use with simultaneous look up of requested data in order to know the status of the other cache module. Cache module 1 and cache module 2 output data via data output lines (Data-Out) 62 and 64 respectively. A multiplexer 200 is used to output data from either cache module 1 or cache module 2. Also includes is a select victim unit 72 which determine which cache module to use if to retrieve data from memory in the situation where neither cache module has the data. Select victim unit 72 can for example, alternate between the cache modules in assigning the cache module to retrieve data from memory or can use any other method of assigning a cache module to retrieve data known in the art.

Figure 8:
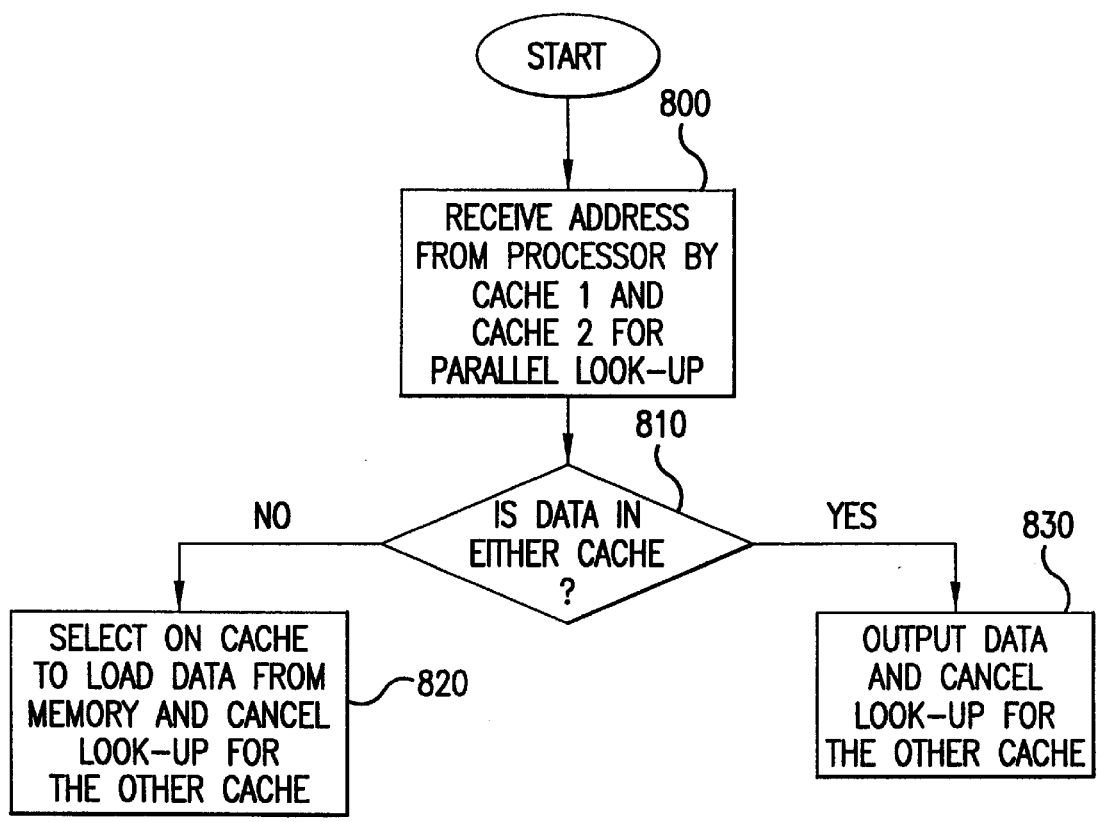
FIG. 8 is a flow diagram illustrating a method for transferring data in a parallel interconnection mode of two cache modules according to an embodiment of the present invention.

FIG. 8 illustrates a method for transferring data in the parallel interconnection mode of two caches according to an embodiment of the present invention. The method begins by receiving an address from processor 12 by cache module 1 and cache module 2 for parallel look up (Step 800). A determination is made as to whether the data is in either cache module (Step 810). If the data is in at least one of the cache modules, the data is output by that cache module and the look up for the other cache is canceled (Step 830). Alternatively, if neither cache module has the data, a selection is made using select victim unit 72 to load data from memory by one of the cache modules and cancel the lookup for the other cache module (Step 820).

Figure 6:
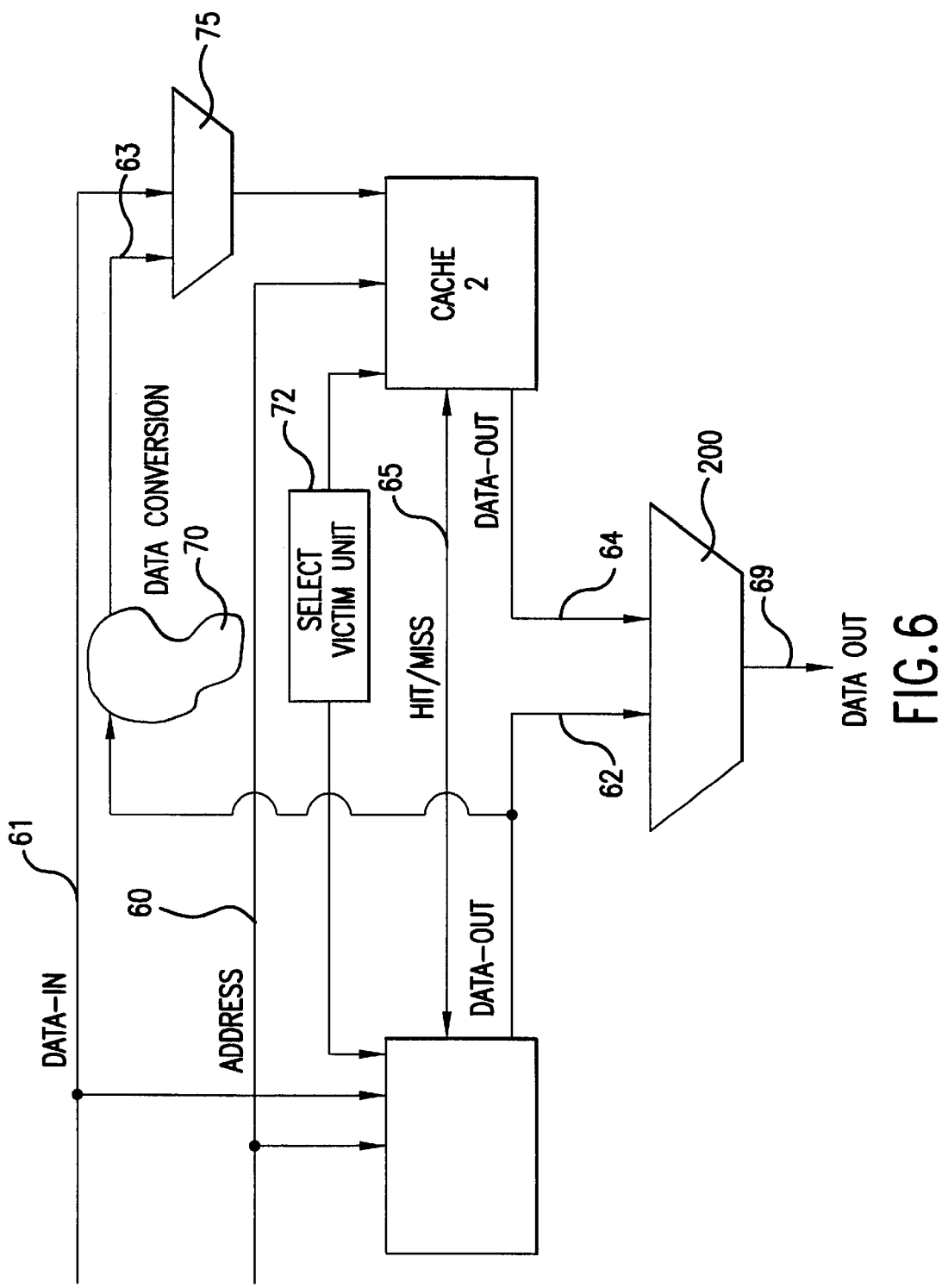
FIG. 6 is a block diagram illustrating a serial and parallel interconnection mode of two cache modules according to an embodiment of the present invention.

FIG. 6 illustrates a serial/parallel interconnection mode of two cache modules according to an embodiment of the present invention. In the serial/parallel interconnection mode, cache module 1 may be a level 2 (L2) cache, and cache module 2 may be a level 1 (L1) cache for example. Alternatively, cache module 1 and cache module 2 may be the same type of cache.

In the serial/parallel interconnection mode, cache module 1 and cache module 2 are each directly coupled to an address generating line (address line ) 60. Address line 60 may also be coupled to processor 12. Cache module 1 is further coupled to a data generating line (Data-1n) 61 and a hit/miss generating line (hit/miss) 65 is coupled between cache module 1 and cache module 2. In addition, select victim unit 72 is also coupled between cache module 1 and cache module 2. Cache module 1 outputs data on data output line (Data-Out) 62. Data output line 62 is also coupled to a data converter 70. Data converter converts the format of data from cache module 1 to a format used by cache module 2. The output of data converter 70 is supplied to a multiplexer 75 via data generating line (Data-In) 63. Data generating line 61 is also supplied to multiplexer 75. Multiplexer 75 determines what type of data (e.g., data from memory or data from cache module 1) to input and send to cache module 2. Data from cache module 1 is sent via data output line 62 to multiplexer 200 and data from cache module 2 is output via data output line 64 to multiplexer 200. Multiplexer 200 determines the correct data to output.

Several embodiments of the present invention are specifically illustrated and/or described herein. However, it will be appreciated that modifications and variations of the embodiments of the present invention are covered by the above teachings and within the purview of the appended claims without departing from the spirit and intended scope of the invention.

What is claimed is:

1. A computer system having cache modules interconnected in series comprising:
    a first and a second cache module directly coupled to an address generating line for parallel lookup of data; and
    data conversion logic coupled between said first cache module and said second cache module, said data conversion logic configured to convert the data from a first data type of the first cache module to a second data type of the second cache module.

2. The computer system according to claim 1, wherein said first cache module is coupled to a data generating line and said second cache module is coupled to an output from said first cache module.

3. The computer system according to claim 1, further comprising a hit/miss generating line coupled between said first and second cache modules wherein said hit/miss generating line sends an indication whether data is found in said second cache module.

4. The computer system according to claim 1, wherein said first cache module is a level 2 (L2) cache.

5. The computer system according to claim 1, wherein said second cache module is a level 1 (L1) cache.

6. The computer system according to claim 3, wherein if a hit occurs in said second cache module, an indication is send to said first cache module via said hit/miss generating line.

7. The computer system according to claim 1, wherein if a miss occurs in said second cache module and said first cache module, the data is provided from a memory of the computer system to said first cache module.

8. The computer system according to claim 1, wherein after the data is provided from a memory of the computer system to said first cache module, said data is converted.

9. The computer system according to claim 8, wherein after data is converted, said data is provided to said second cache module.

10. The computer system according to claim 1, wherein if a hit occurs in said first cache module, said data is converted.

11. The computer system according to claim 10, wherein after data is converted, said data is provided to said second cache module.

12. The computer system according to claim 1, wherein said first cache module and said second cache module contain data that are transformed in character.

13. The computer system according to claim 12, wherein said first cache module contains floating point data.

14. The computer system according to claim 12, wherein said second cache module contains integer data.

15. The computer system according to claim 1, wherein said data conversion logic transforms floating point data into integer data.

16. A computer system having caches interconnected in parallel comprising:
    a first and a second cache module directly coupled to an address generating line for parallel lookup of data and directly connected to a data generating line;
    a hit/miss generating line directly coupled between the first cache module and the second cache module, the hit/miss generating line configured to send an indicator from any one of the first and second cache modules to the other of the first and second cache modules to indicate whether the data is found in the one of the first and second cache modules,
        wherein if the indicator indicates a hit occurred in the one of the first and second cache modules, the other of the first and second cache modules cancels a search for the data, and
        if the indicator indicates a miss occurred in the one and the other of the first and second cache modules, the one or the other of the first and second cache modules receives the data from a memory of the computer system; and
    a select victim unit directly coupled between the first cache module and the second cache module, the select victim unit configured to select any one of the first and second cache modules to receive the data from a memory of the computer system when the data is not found in the first and second cache modules, wherein when the one of the first and second cache modules is selected, the other of the first and second cache modules cancels the search for the data.

17. The computer system according to claim 16, wherein data stored in said first cache module and data stored in said second cache module is the same data type.

18. A computer system having caches interconnected in series/parallel comprising:

a first and a second cache module directly coupled to an address generating line for parallel lookup of data; and data conversion logic coupled between said first cache module and said second cache module, said data conversion logic configured to convert the data from a first data type of the first cache module to a second data type of the second cache module;

wherein said first cache module is coupled to a data generating line and said second cache module is coupled to a multiplexer providing the data from a memory of the computer system and from said first cache module.

* * * * *